March 3, 1964  B. MICHAELS  3,122,965
AUTOMATIC FILM THREADING DEVICE
Filed Dec. 29, 1958  11 Sheets-Sheet 1

INVENTOR.
Bruno Michaels
BY
Robert F. Miehle, Jr.
Att'y

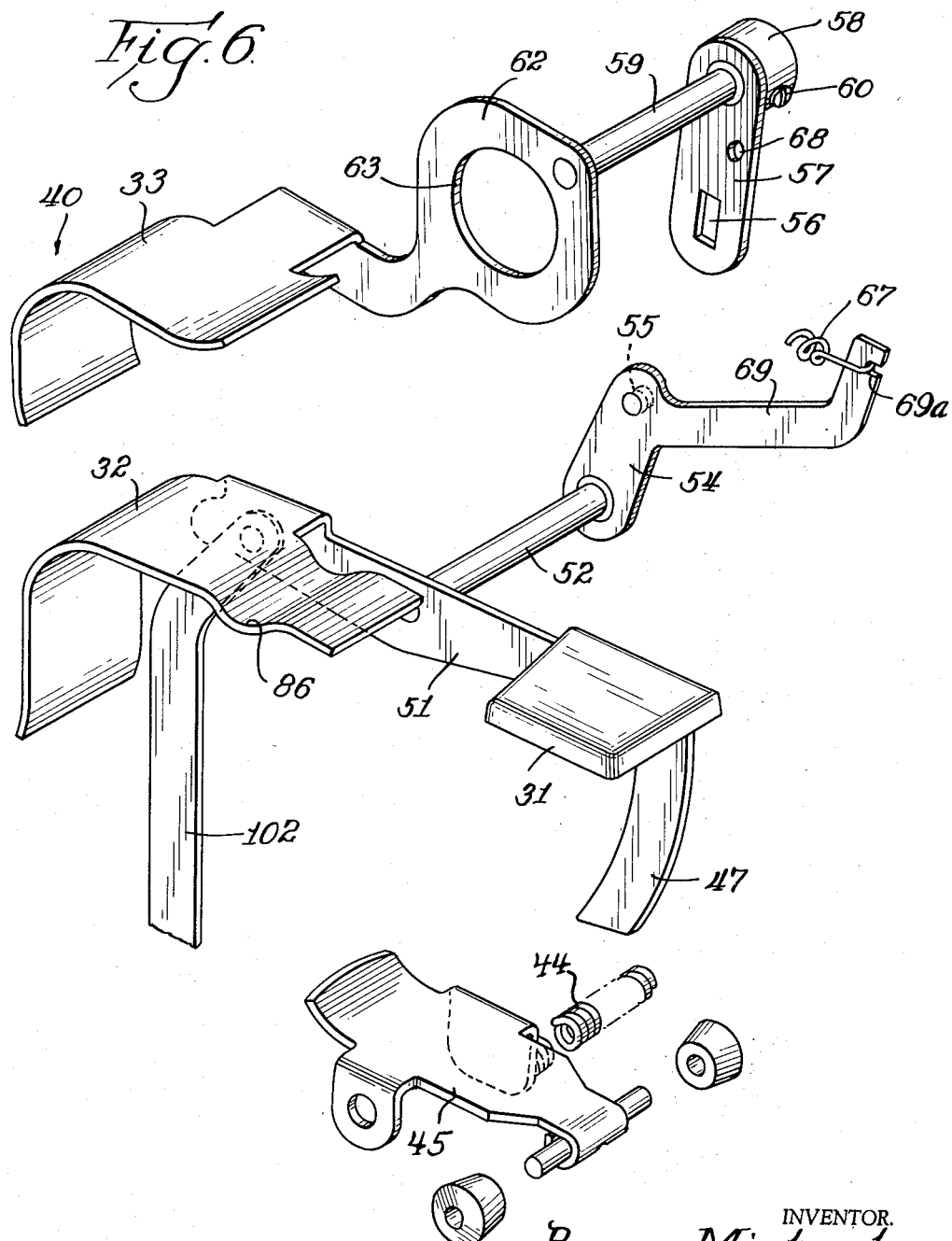

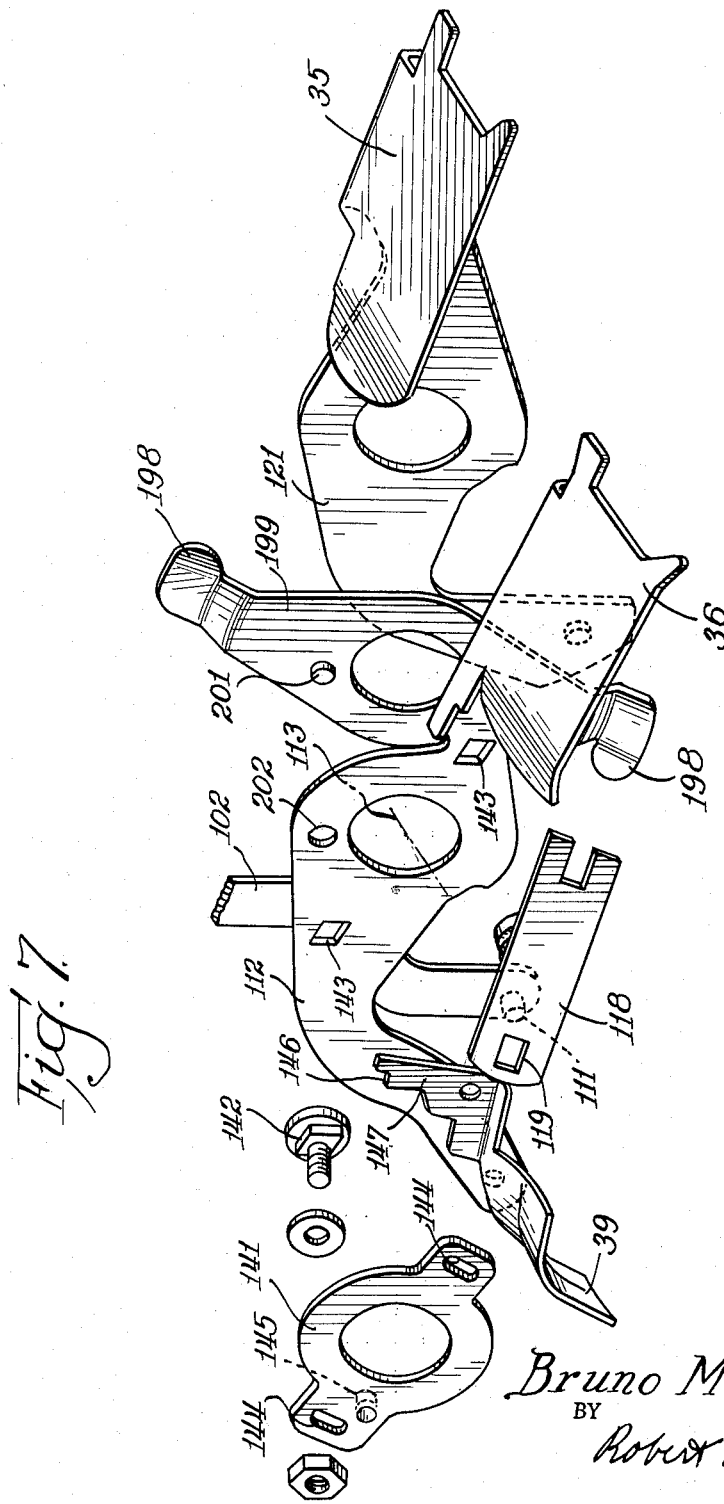

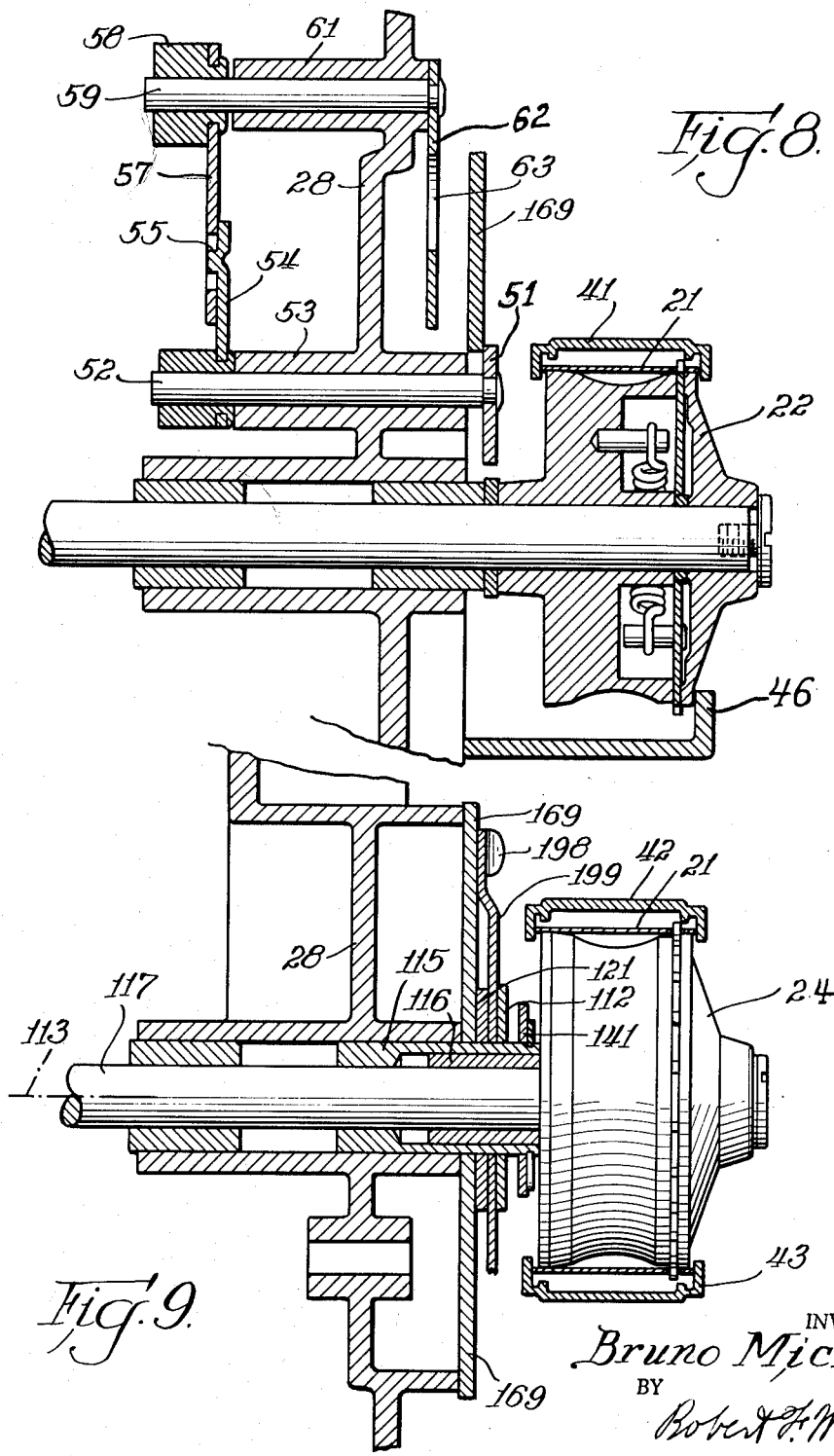

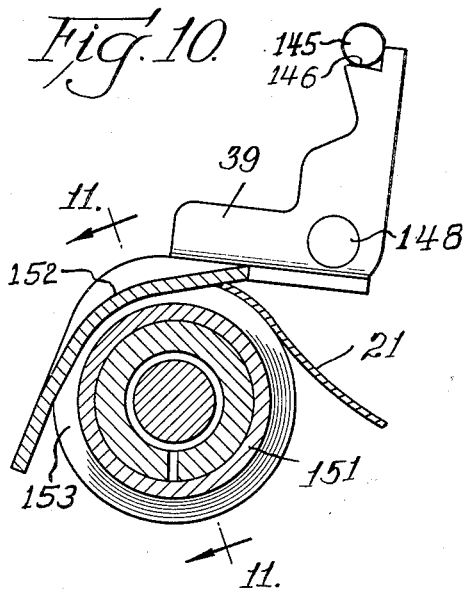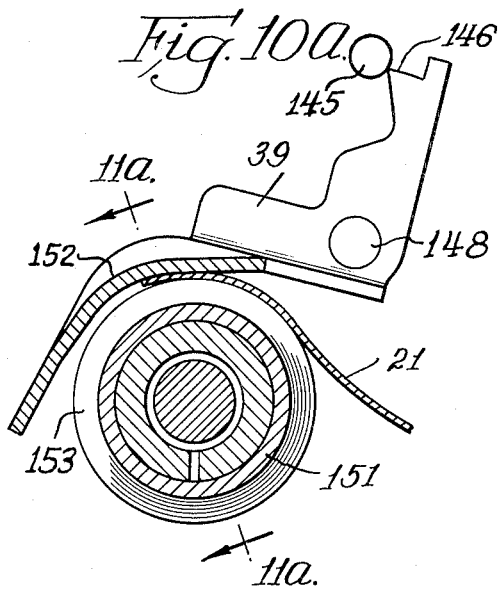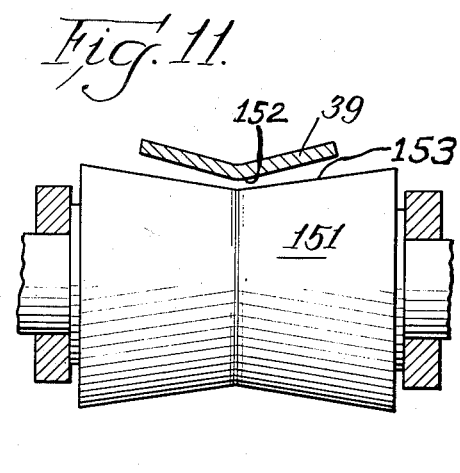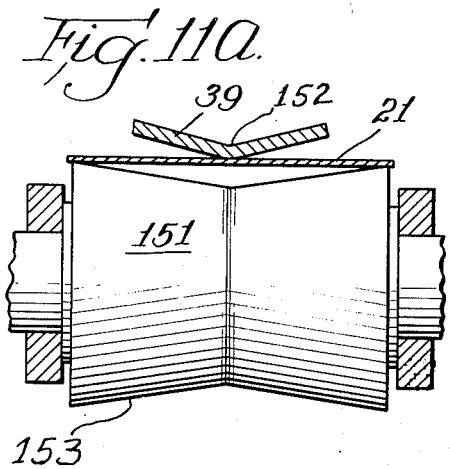

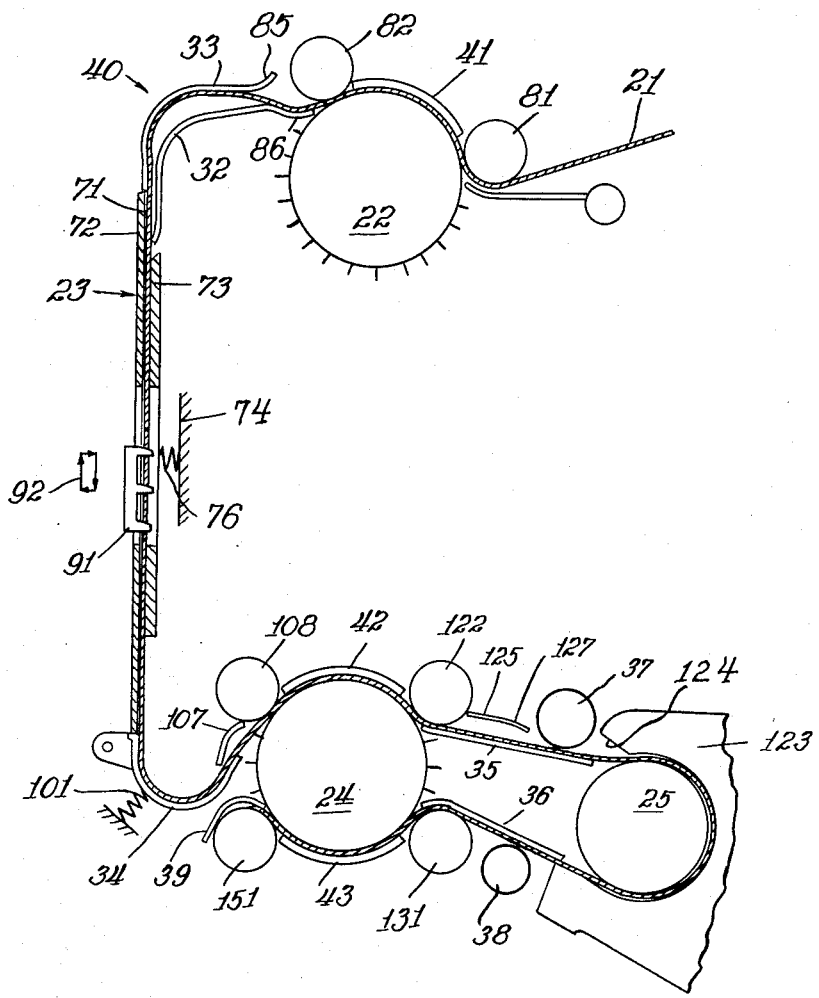

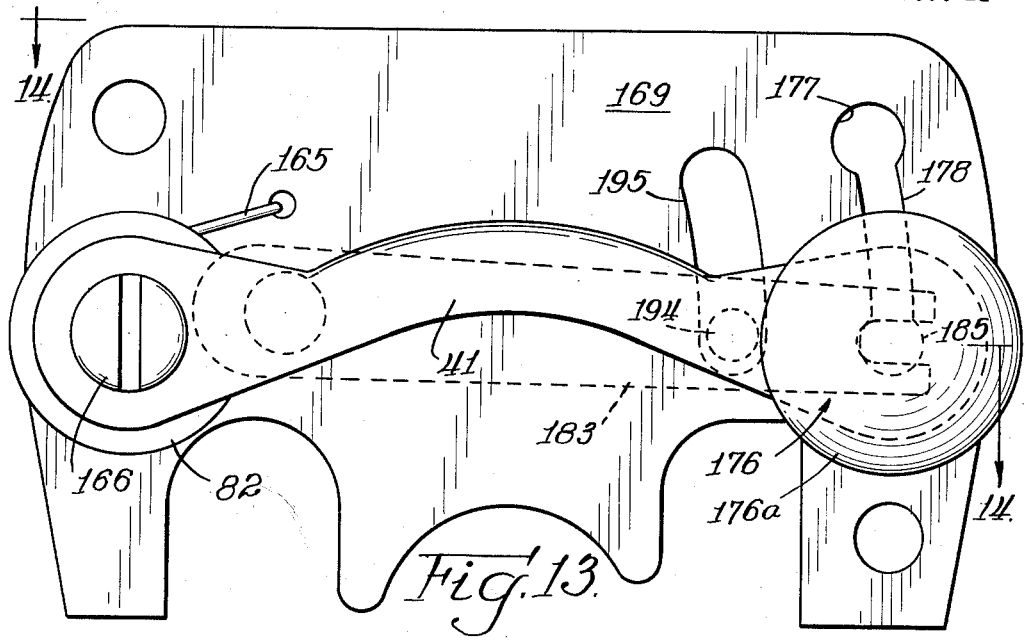
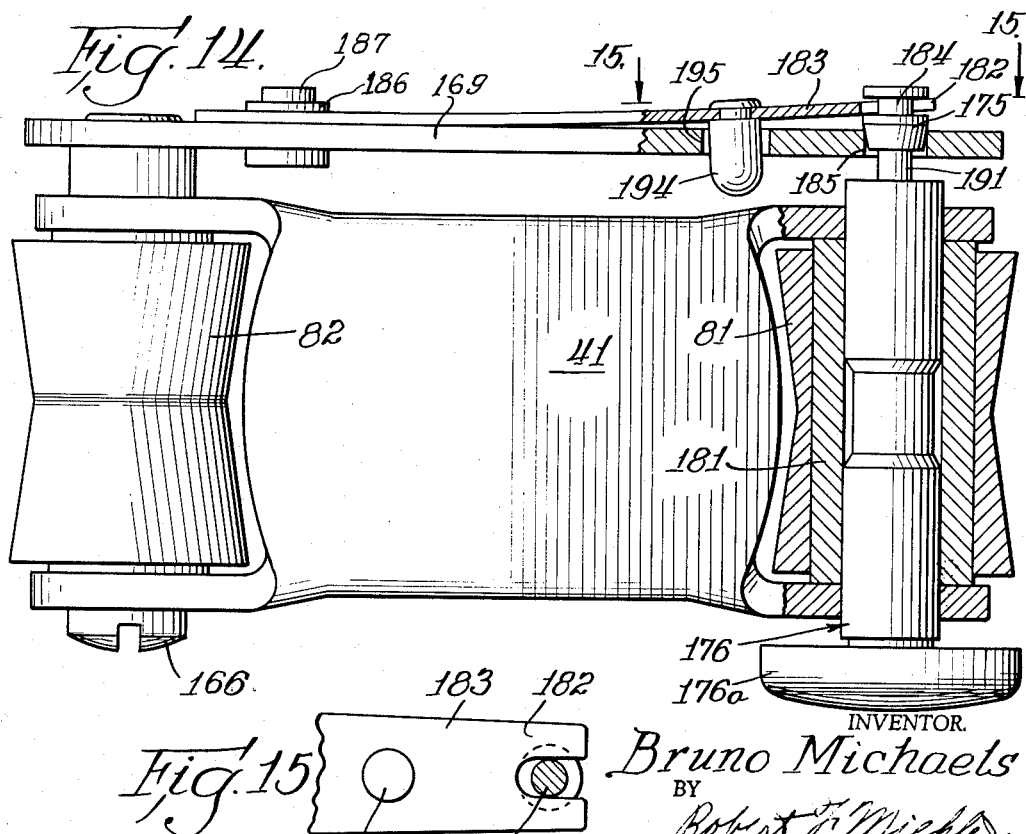

United States Patent Office 3,122,965
Patented Mar. 3, 1964

1

3,122,965
AUTOMATIC FILM THREADING DEVICE
Bruno Michaels, Chicago, Ill., assignor to Bell & Howell Company, Chicago, Ill., a corporation of Illinois
Filed Dec. 29, 1958, Ser. No. 783,248
12 Claims. (Cl. 88—17)

This invention relates to an automatic film threading device, and more particularly to a self threading movie projector.

An object of the invention is to provide new and improved apparatus for automatically threading film through the film feeding and gate portion of a movie projector.

Another object of the invention is to provide apparatus for automatically threading film through both the optical and sound portions of a movie projector and for providing a precise length of film between the film aperture and the sound pickup even though the sound portion may have a stabilizer pressed resiliently against the portion of the film between the aperture and the sound pickup.

Still another object of the invention is to provide a movie projector which serves to thread the starting end of a film automatically through the film feeding and optical portions thereof and also permits the film portions of the film intermediate its ends to be manually unthreaded from and rethreaded through the film feeding and optical portions of the projector.

Yet another object of the invention is to provide a movie projector in which automatic means are provided for threading a film through the film transporting and optical portions thereof together with means for insuring that the film transporting means is in operative condition.

A further object of the invention is to provide a film threader for a movie projector which serves to thread film through the film gate without opening the gate.

Another object of the invention is to provide a reset mechanism for a self-threading projector which is positivly actuated.

A complete understanding of the invention may be obtained from the following detailed description of a self-threading movie projector forming a specific embodiment thereof, when read in conjuntion with the appended drawings, in which FIG. 1 is a side elevation view of a self threading movie projector forming one embodiment of the invention;

FIGS. 2 and 3 when fitted together form an enlarged fragmentary side elevation view of the self threading portion of the projector while in its non-threading condition;

FIGS. 4 and 5 when fitted together form an enlarged, fragmentary side elevation view similar to FIGS. 2 and 3 but with the self-threading portion in its threading condition;

FIGS. 6 and 7 are exploded perspective views of threading elements of the projector;

FIG. 8 is a fragmentary, vertical section of the projector taken along line 8—8 of FIG. 4;

FIG. 9 is a fragmentary vertical section of the projector taken along line 9—9 of FIG. 5;

FIG. 10 is an enlarged side elevation view of a triggering mechanism of the projector;

FIG. 10a is a view similar to FIG. 10 but with the triggering mechanism triggered;

FIG. 11 is a section taken along line 11—11 of FIG. 10;

FIG. 11a is a view similar to FIG. 11 but with the triggering mechanism triggered;

FIG. 12 is a schematic representation of the portion of the film path of the projector which is automatically threaded.

2

Figure 1:
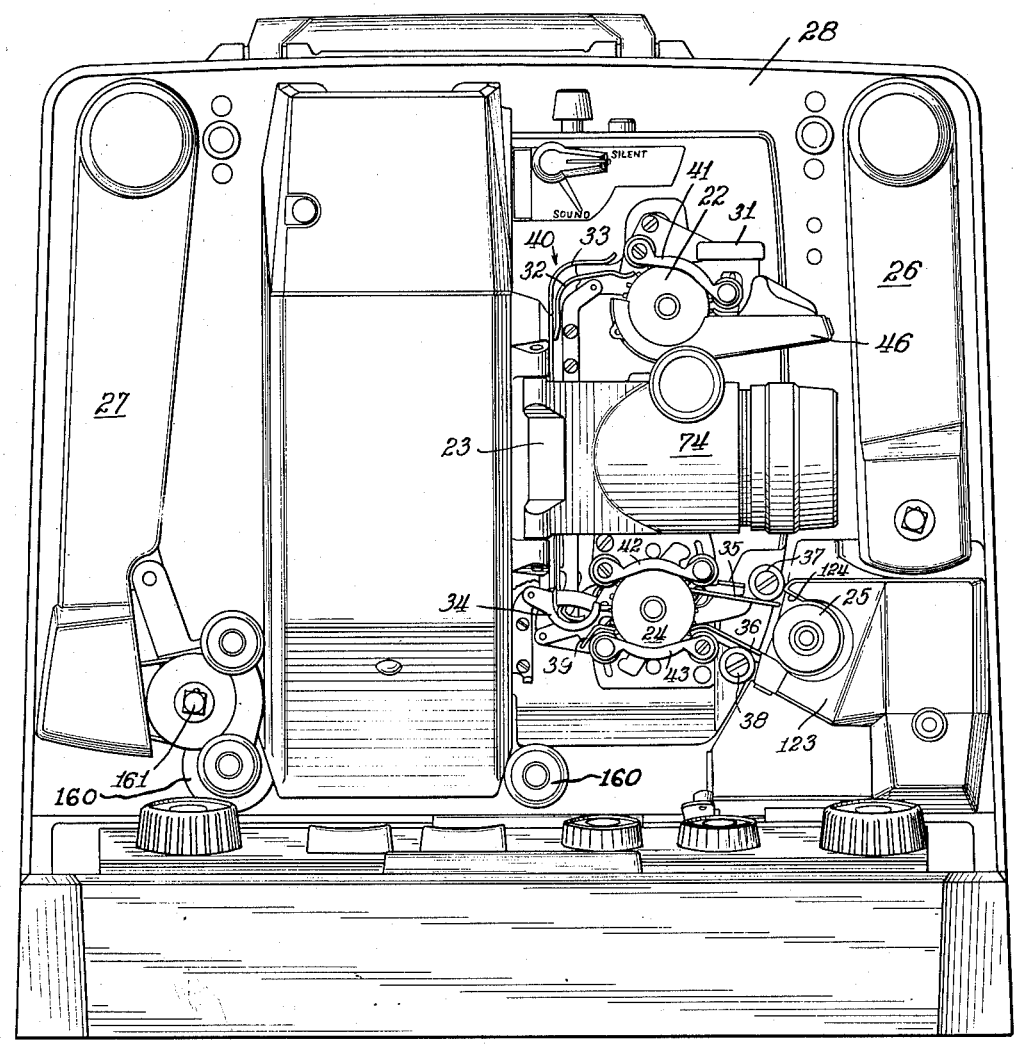

FIG. 13 is an enlarged side elevation view of the sprocket guide structure of the projector;

FIG. 14 is a fragmentary horizontal section taken along line 14—14 of FIG. 13; and FIG. 15 is a vertical section taken along line 15—15 of FIG. 14.

The invention provides a self-threading device for a movie projector or the like which automatically forms a restrained path for the film while the film is being threaded and an unrestrained path for portions of the film after threading. The device may include an upper loop former having opposed members which may be moved toward each other to define a stiff or closely confined path for the film. The upper loop former restrains buckling of the film so that as the film is advaned from the upper sprocket toward the gate, the film is thrust between the pressure plate and aperture plate without the necessity of opening the gate. A lower loop former at the bottom of the gate preferably is interlinked with the upper loop former and during threading is moved from a retracted position to a loop forming position guiding the film from the gate to the upper side of a lower sprocket. The lower loop former is resiliently urged to this position to define a path of a precise length such that as the perforated film is picked up by the teeth of the lower sprocket, the perforations in the portion of the film between the film gate and aperture plate are properly positioned to be cleanly entered by teeth of the film claw or shuttle at the gate. The resiliently urged lower loop former provides an expansible path for the film so that the shuttle will feed the film without damage to the perforated portions regardless of the framing position and even though the distance between the perforations vary from that of green or unshrunk film to that of aged or shrunken film. The projector may be provided with a sound drum positioned beyond the lower sprocket with the film path extending from the upper portion of this spocket to and around the sound drum and then back to the lower portion of this sprocket with spring pressed opposed stabilizing rollers urged from the outside toward the portions of the film path between the lower sprocket and the sound drum. To thread the sound drum, there may be provided a guide extending partially around the drum together with a pair of film guides inside the portions of the path between the lower sprocket. This pair of guides normally are in retracted positions but during threading are moved outwardly to move the stabilizing rollers out of the film path and also guide the film to and from the sound drum. There also may be provided a trigger member curved both transversely and longitudinally to stiffen the film to actuate the trigger to release the threading device.

Referring more specifically to the drawings, there is shown therein a movie projector 20 which may be automatically laced or threaded with a film 21 along a film transport path. The transport path extends over an upper feed sprocket 22, through a gate 23, over the top of a lower feed sprocket 24, around a sound drum 25 and under the lower sprocket 24. The projector has a folding arm 26 (FIG. 1) for supporting a film supply reel (not shown) and a folding arm 27 for supporting and driving a film takeup reel, both arms being mounted on an upright frame plate 28.

To automatically thread the starting end of the film through the projector, an actuator comprising a projecting tab or handle 31 is manually pushed downwardly to its position shown in FIG. 1. This actuation moves inner and outer guides 32 and 33 of an upper loop former 40 to adjacent loop-forming positions, moves a lower loop former 34 upwardly to its loop forming position, moves spreaders 35 and 36 apart to film guiding positions and move spring pressed stabilizer rolls 37 and 38 apart, and moves a latch releasing trigger 39 into the path of the forward end of the film as the film comes from the under portion of the sprocket 24. Such actuation of the actuator 31 latches the loop formers 40 and 34, the spreaders 35 and 36 and the trigger 39 in their operative or loop forming positions. This actuation also releases sprocket guides 41, 42 and 43 to permit them to be moved by springs (not shown) into operative positions relative to the sprockets 22 and 24 if the guides 41, 42 and 43 have been inadvertently left open. The actuator also has an arm 47 (FIG. 2) which engages a spring 44 on a blocking plate 45 to pivot the plate downwardly out of a blocking position to a position permitting insertion of the end of the film through a channel-like entrance guide 46 to the sprocket 22, after which the film travels freely through the guide 46, the weight of the film holding the blocking plate out of blocking position.

Figure 2:
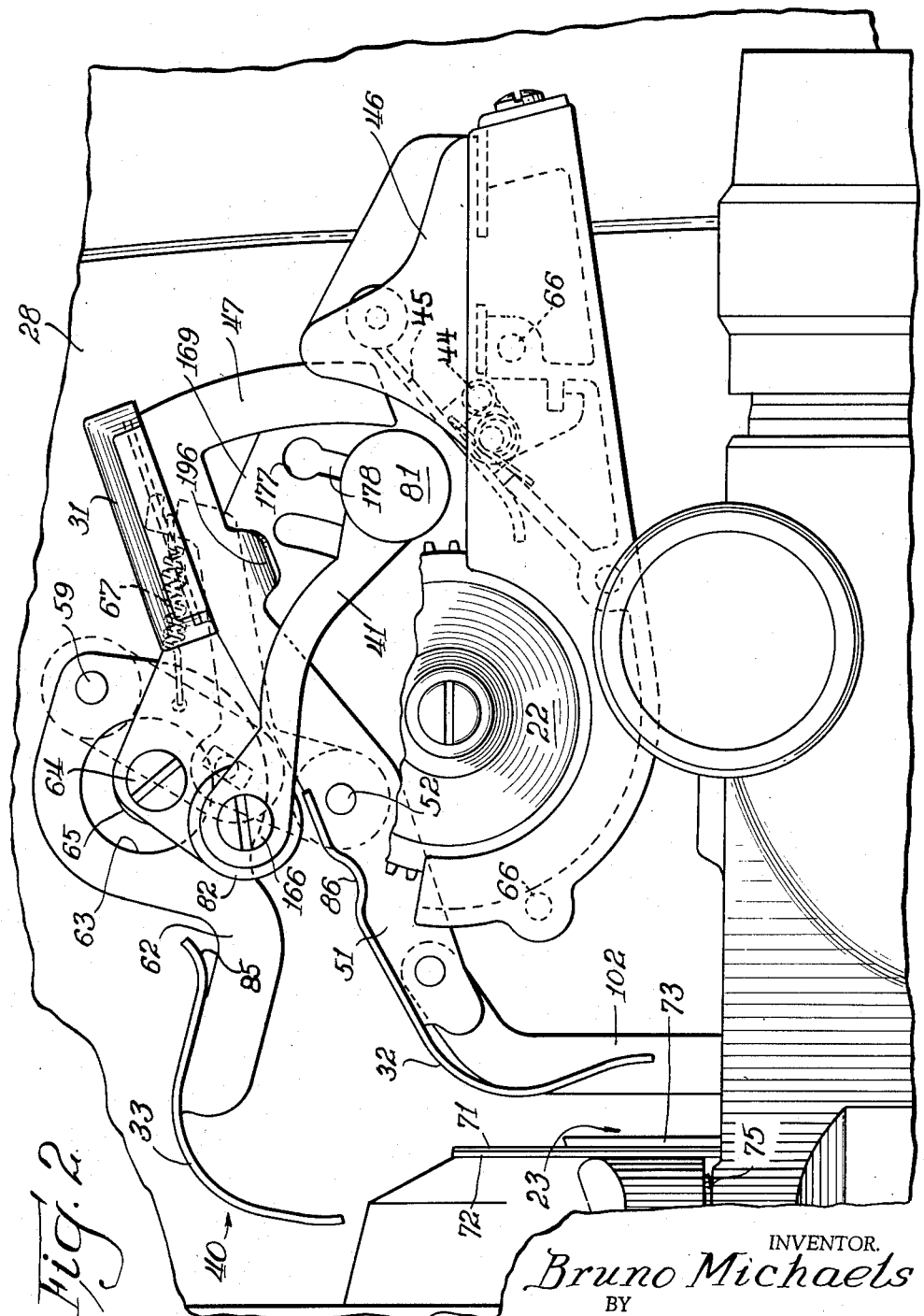

The self threading device includes a rigid lever 51 (FIGS. 6 and 8) keyed to a shaft 52 freely rotatable in a bearing 53 in the frame plate 28, and the actuator 31, the arm 47 and inner guide 32 of the upper loop former 40 are formed integrally with the lever 51. To connect the lever 51 with the inner guide 32 to the outer guide 33, there is provided a sheet metal arm 54 rigidly fixed to the end of the shaft 52. The arm 54 has a pin 55 integral therewith which fits into a slot 56 formed in an arm 57. A hub 58 intgeral with the arm 57 is fixed to a shaft 59 by a set screw 60. The shaft 59 is journalled in bearing 61 of the frame 28, and a sheet metal arm 62 is rigidly secured to the shaft 59 and carries the outer guide 33 integrally therewith. The arm 62 has a clearance bore 63 to permit movement of the arm 62 relative to a tapped boss 65 into which is threaded a mounting screw 64 (FIG. 4), which supports entrance guide 46 rigidly on the frame 28 along with pins 66 (FIG. 2).

One end of a tension spring 67 (FIG. 6) is hooked in a hole 68 in the arm 57 fairly near to the shaft 59, and the other end is hooked in a notch 69a in an elongated L-shaped extension 69 of the arm 54. The spring urges the arm 54 in a counter-clockwise direction, as viewed in FIG. 6, and also urges the arm 57 in the counter-clockwise direction. However, since the arms 54 and 57 are connected by the pin 55 and slot 56, the arms must rotate in opposite directions, and since the point at which the spring is connected to the arm extension 69 is much farther from the shaft 52 than is the hole 68 from the shaft 59, the direction of movement that the spring urges the arm 54 prevails. Thus, the effect of the spring 67 is to normally urge the arm 54 to its furthermost counter-clockwise position where the pin 55 engages the lower end of the slot 56. In this position of the arm 54, the guides 32 and 33 are in their retracted or inoperative positions which positions are illustrated in FIG. 2.

Figure 4:
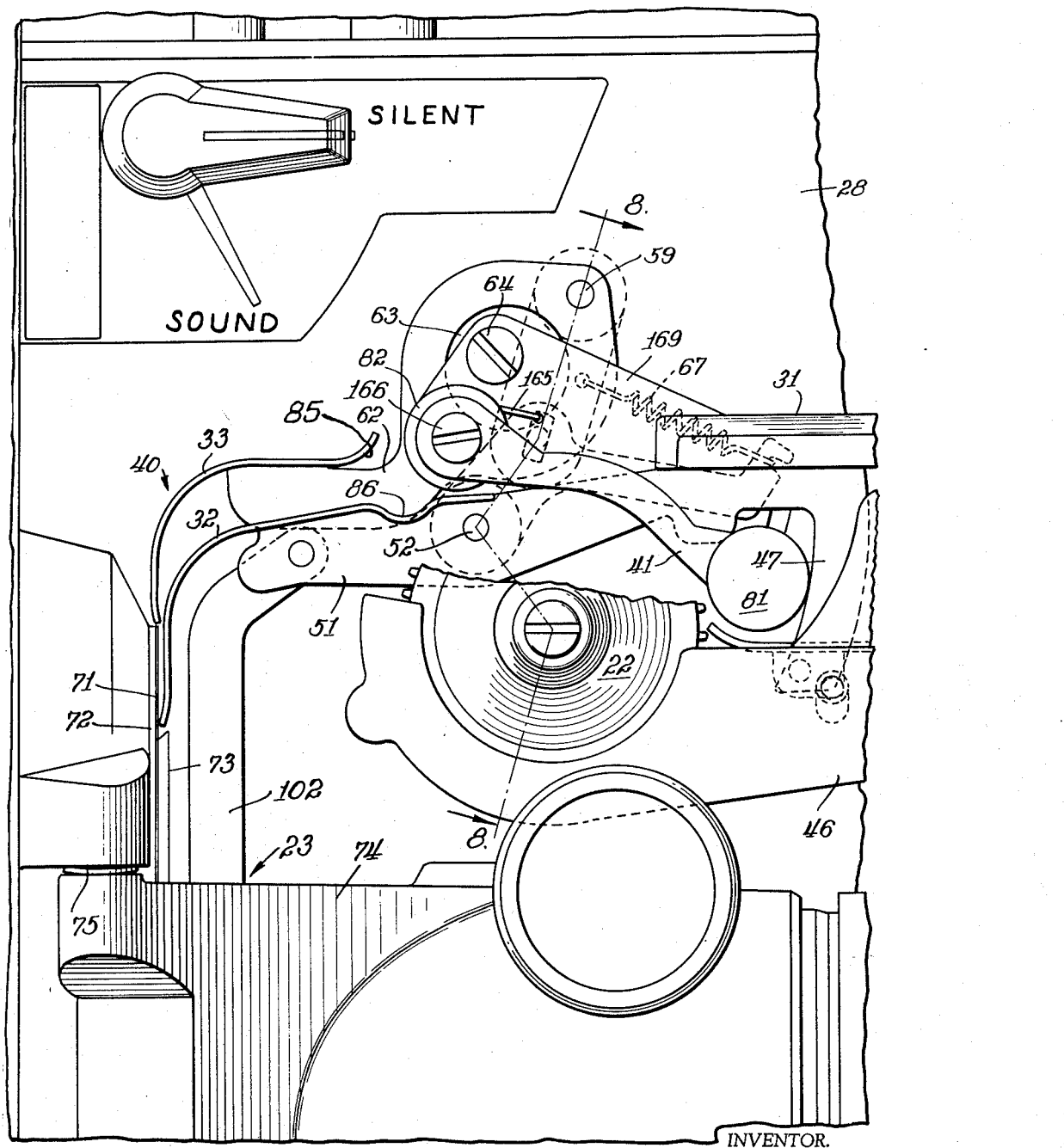

When the actuator 31 is pressed downwardly, the guide 32 is swung in a clockwise direction to its operative position as illustrated in FIG. 4. As the guide is so swung, the pin 55 (FIG. 6) swings the arm 57 and lever 62 in a counter-clockwise direction, as viewed in FIG. 6, to position the guide 33 in its operative position as shown in FIG. 4. In this position the guides 32 and 33 are placed close together to form a stiff path for the film 21 to greatly limit buckling of any portion of the film therebetween. Also, the lower end of the guide 33 is close to and overhangs guide ribs 71 of aperture plate 72 to guide the film slightly to the right of the ribs 71. The lower end of guide 32 is spaced close to and substantially directly above the upper end of pressure plate 73 of the gate 23. The plate 73 is tapered or bevelled at its upper end to guide the film between the plate 73 and the aperture plate 72, and, as is well known in the projector art, the plate 73 is carried by a lens mount 74 hinged at 75 and the pressure plate is urged by a spring 76 (FIG. 2) toward the left, as viewed in FIG. 4.

When the actuator 31 is depressed to move the loop former 40 to its operative position and these elements are latched in their operative positions, the operator inserts the end of the film into the entrance guide 46 and between the sprocket 22 and guide roller 81 of the sprocket guide 41. The sprocket 22 then advances the film to the left, as veiwed in FIG. 12, and the film travels over the sprocket and under guide 41 and guide roller 82 of the guide 41. The sprocket 22 continues to feed the film to the left, and the film engages the outer guide 33 and conforms to its inner surface. The forward end of the film then travels in a downward direction sequentially past the upper end of the aperture plate 72, the lower end of inner guide 32 to a position near the bevelled upper end of the pressure plate. At this point travel of the forward end of the film is resisted slightly by the bevelled upper end of the pressure plate since pressure plate is normally urged against the aperture plate 72 in the absence of film therebetween. This resistance tends to cause the film to buckle, but, as the film starts to buckle, the film is restrained by the inner guide 32 and the forward end of the film is moved between the plates 73 and 72 and downwarly therebetween. The action of the inner guide 32 is to cooperate with the outer guide to stiffen the film by limiting buckling of the film during lacing. The guides 32 and 33 form what may be designated a stiff path for the film from the upper sprocket 22 to the gate 23. However, the guide 33 has an upwardly curved entrance portion 85 spaced sufficiently far from the roller 82 that a safety spillout gap is formed therebetween to permit spilling out of the film if for any reason the feed of the film through the gate should ever be stopped.

The lower guide is provided with an arcuate depressed portion 86 just behind the spillout gap in the feed of the film. The portion 86 permits a loop or buckle of the film to form therein when any jam occurs at a point prior to the portion of the film path at which the shuttle normally would engage the film to permit the film to move out the spillout gap without any very sharp bends which would permanently crease the film. The film path formed by the roller 82 and the guides 32 and 33 is such that much greater resistance to advance of the feed of the film than that occurring during threading of the film through the gate is required before spillout occurs. Also, when the guides 32 and 33 are in their retracted positions, the spillout gap is wider than it is when the guides are in their film guiding or operative positions.

In addition to the lower end of the outer guide 33 overhanging the upper end of the aperture plate 72 and the ribs 71 thereon, the lower portion of the guide 33 directs the leading end of the film somewhat to the right, as viewed in FIG. 4, so that curl of the film to the left cannot cause the film to engage the upper end of the plate 72. Also, the spring 67 holds the lower end of the guide 33 against the upper end of the aperture plate 72 so that there is no clearance therebetween. Similarly, to insure that the forward end of the film does not engage the upper end of the pressure plate 73, the lower end of the guide 32 is directed somewhat to the left as well as downwardly to direct the forward end of the film against the aperture plate and cause it to enter between the pressure plate past the upper end of the pressure plate.

The film slides easily between the plates 72 and 73, and is picked up by shuttle 91 which has a parallelogram movement as indicated at 92 to provide desired intermittent feed of the film to and past the aperture in the plate 72. The shuttle itself and drive are disclosed and claimed in Stechbart Patent 2,489,829 assigned to the present assignee. The throw of the shuttle up and down may be adjusted vertically for framing as described in the above patent.

To form the lower loop during lacing or threading, the lower loop former is swung upwardly by a spring 101 (FIGS. 3 and 5) secured to a link 102 connected pivotally at its upper end to the inner guide 32. The link 102 is guided by screws 103 extending through slots 104 in the link 102 and threaded into bosses in the frame 28. The lower loop former 34 is pivoted on pin 105 mounted on bracket 106 secured to the frame 28. The loop former 34 is resiliently held in its upper or loop forming position by the spring 101 and guides the forward end of the film to a fixed plate 107 which directs it between the upper side of the sprocket 24 and roller 108 of sprocket guide 42. The sprocket 24 then picks up or latches the film and advances it continuously to the right, the teeth of the sprocket entering the perforations in the film. To be sure that the sprocket teeth properly mesh with the perforations in the film spaced a selected number of frames away from the frame at the aperture and do so whether the particular film being threaded is green or aged and shrunk, the shuttle framing is adjusted to its extreme upper position and shrunk film is threaded to the sprocket 24 which is then keyed to its driving shaft by known means (not shown) in a position such that one of its teeth just barely enters the first perforation in the film. Then, even though framing is adjusted and green film is used the teeth of the sprocket 24 will enter the perforations without mutilating the film. The lower loop former 34 is resiliently held in position also to permit the path of the film to expand while the shuttle is feeding forwardly, particularly during threading of green film, the shuttle feeding the film during its feeding stroke much more rapidly than the sprocket 24 although the average film advancing speed of the shuttle and sprocket are the same. The resilient holding of the loop former 34 prevents excessive compressive forces on the film by the teeth of the shuttle and the sprocket 24.

Figure 3:
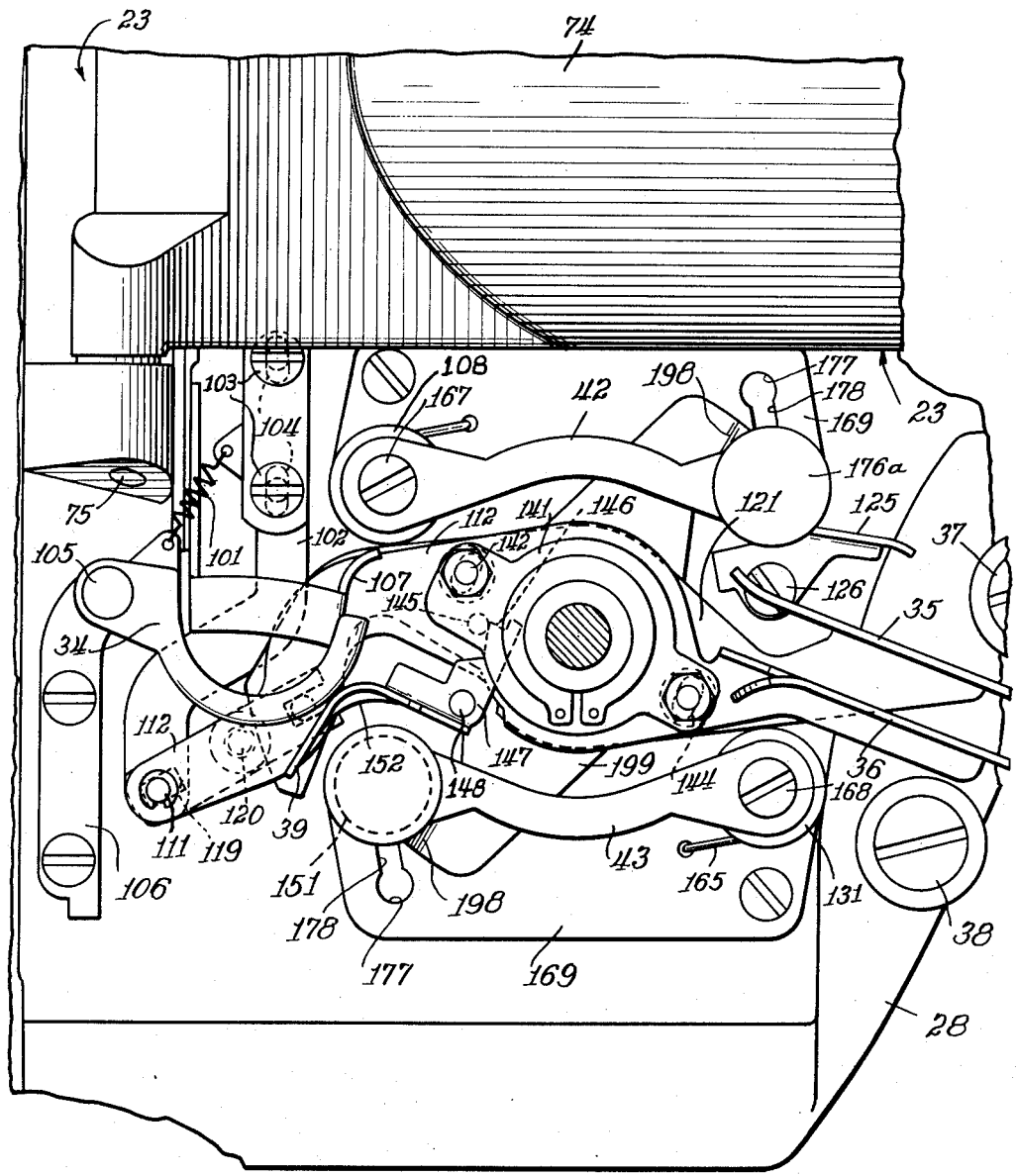

When the actuator 31 is moved downwardly to set the loop formers 34 and 40 in threading positions, the link 102 is moved upwardly and a pin 111 fixed to the lower end thereof pivots a lever 112 in a clockwise direction, as viewed in FIGS. 3 and 7, about a fixed axis of rotation 113. The pin 111 pivotally connects the link 102 to the lever 112. The lever 112 carries the spreader 36 downwardly to its threading position, the spreader 36 moving stabilizer 38 (FIG. 1) downwardly also. The lever 112 is mounted rotatably on a bearing sleeve 115 (FIG. 9) in frame plate 28, the sleeve 115 also mounting a bushing 116 supporting drive shaft 117 of the sprocket 24. The link 102 also pivots a lever 118 (FIGS. 3, 5 and 7) in a clockwise direction by the pin 111 which fits in a slot 119 in the lever 118. The lever 118 is mounted rotatably on a fixed axis by a post 120 threaded into a tapped boss in the frame plate 28. The lever 118 swings lever 121 counter-clockwise by means of a pin and slot connection 119 (FIG. 5) to swing the spreader 35 carried integrally therewith to its threading position. The lever 121 moves spring pressed stabilizer roll 37 (FIG. 12) up out the path of the film and forms a guide between roller 122 of guide 42 and the sound drum 25 and a U-shaped guide 123. The guide 123 has a tapered entrance portion 124 and guides the film loosely around the sound drum. An upper guide 125 (FIG. 5) fixed to frame plate 28 by screw 126 has a downwardly tilted exit portion 127 to direct the forward end of the film under the end of tapered portion 124 (FIG. 12) of guide 123.

As the forward end of the film 21 travels under the roller 122, the guide 35 strips it from the sprocket 24, and the film end travels between the guides 35 and 125 and into and along the U-shaped guide 123 and enters between the guide 36 and the stabilizer roll 38. Then the forward end of the film travels under the guide 36 to a position between the guide 36 and roller 131 of the sprocket guide 43 and enters between the sprocket 24 and the guide 43, the teeth of the sprocket 24 entering the perforations in the film. By the above structure, there is a precise number of frames in the portion of the film from the upper side of the sprocket 24 to the lower side thereof. Also, in operation, there is a precise number of frames between the aperture in aperture plate 72 and the sound pickup portion of the drum 25. The film during threading is spaced slightly from the sound drum 25 so that, in the case of shrunken film, there is just a sufficient length of film from the roller 122 to the roller 131 for the teeth of the sprocket 24 to pick up the perforations without tightening the film on the sound drum.

Figure 5:
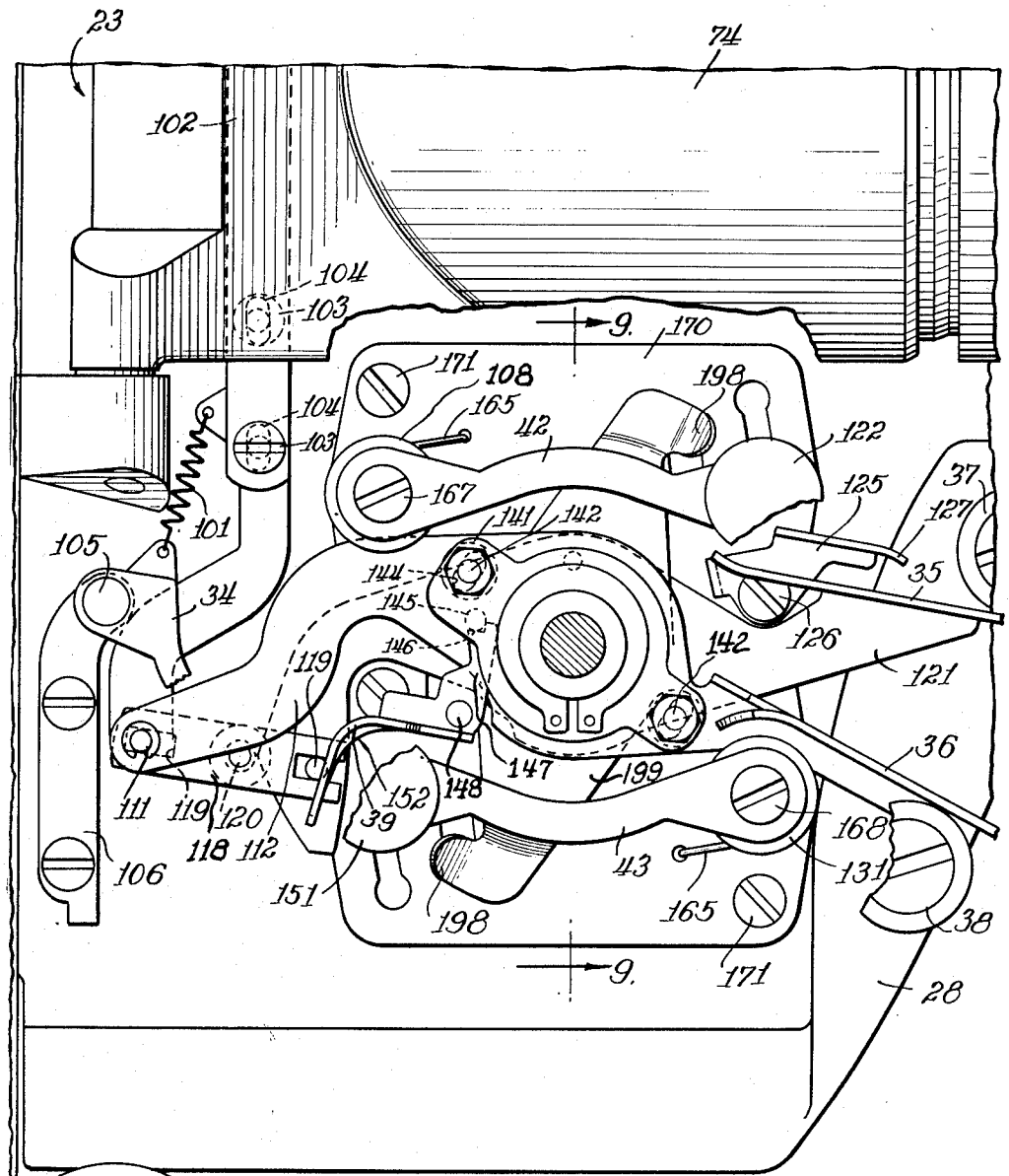

When the actuator 31 is pressed manually to move the threading elements to their operative positions in which the lever 112 is swung clockwise, as viewed in FIG. 3, from its position shown in FIG. 3 to that shown in FIG. 5, the lever 112 swings a latching plate 141 therewith. The plate 141 is fixed adjustably to the lever 112 by bolts 142 extending through keying holes 143 (FIG. 7) in the lever 112 and elongated slots 144 in the plate 141. This swings a latching pin 145 fixed to the plate 141 up above a latching shoulder or notch 146 in an arm 147 of trigger 39. The trigger 39 is mounted pivotally on pin 148 fixed to the frame plate 28, and is urged in a counter-clockwise direction, as viewed in FIG. 3, by a torsion spring, not shown). Hence, when the pin 145 clears the shoulder 146, the trigger 39 is swung counter-clockwise and the shoulder 146 swings under the pin 145 to prevent downward movement of the pin 145. This latches the threading elements in their operative positions until the trigger 39 is swung clockwise to move the shoulder 146 out from under the pin 145.

When the trigger 39 moves to its latching position, it moves from a position away from guide roller 151 of sprocket guide 43 to a position close to the roller 151 as illustrated in FIGS. 5, 10 and 11. The trigger 39 is bent transversely so as to curve around the roller 151 and also is curved along its length as illustrated at 152 in FIGS. 10 and 11 to conform to the concave periphery 153 of roller 151. When in its latching position, the compoundly curved portion 152 of the trigger 39 is spaced from the periphery 153 of the roller 151 a distance approximately equal to the thickness of the film. Consequently, the film must curve around its longitudinal axis and also curve transversely in order to pass between the trigger and the guide roller 151. However, this would compoundly curve the film which requires considerable force, and the longitudinal curve is created first so that the resistance of the forward end of the film to the transverse bending forces the trigger away from the roller 151 and releases the pin 145. The spring 67 (FIG. 6) then returns the threading elements to their retracted positions.

Upon releasing actuation of the trigger 39, the guides 32 and 33 are swung away from the upper loop of the film, the lower loop former is swung away from the lower loop of the film which drops away from guide 107, and the guides 35 and 36 swing inwardly away from the film permitting the stabilizing rollers 37 and 38 to engage the film and snug it around the sound drum 25. The forward end of the film then is threaded under guide rollers 160 and attached to a takeup reel (not shown) on spindle 161 of the takeup arm 27 which is swung to its operative position. The projector then is operated as desired.

In order to permit removal and reinsertion of the portion of the film from the gate 23, sprockets 22 and 24 and sound drum 25, the gate 23 is opened, and sprocket guides 41, 42 and 43 are swung away from sprockets 22 and 24 and are latched in their retracted positions against the action of torsion springs 165 (FIGS. 4 and 5). The sprocket guides 41, 42 and 43 are pivotally secured on the mounting plates 169 by screws 166, 167 and 168. The mounting plates 169 are secured by screws 64 and 171 to the frame 28 in positions spaced somewhat from the frame 28 as best shown in FIGS. 8 and 9. The sprocket guides are latched in their retracted positions by enlarged collars 175 (FIG. 14) of pins 176 being urged into enlarged end portions 177 of slots 178 in plates 169. Since each mounting plate 169 is identical and sprocket guides 41, 42 and 43 are identical, only the guide 41 with its associated structure will be described in detail. The pin 176 is slidable in hollow arbor 181 carried by the guide 41 and mounting its roller 81. A forked end 182 of a leaf spring 183 is slidable in reduced portion 184 of the pin to form a pin and slot connection therewith and urges the pin 176 downwardly, as viewed in FIG. 14 to tend to urge the enlarged portion 175 into the slot 178. However, the slot 178 between its enlarged ends 177 and 185 (FIG. 13) is too narrow to receive the enlarged portion 176 of the pin so that whenever the enlarged portion 176 of the pin is in either of the enlarged ends 177 and 185 the guide 41 is latched in the corresponding position. A C-washer 186 and grooved pin 187 mount the leaf spring 183 pivotally on the mounting plate 169 and in a position tending to urge the pin 175 downwardly toward its latched positions.

To move the sprocket guide 41 from its operative position to its retracted position, the operator manually presses a button portion 176a of the pin 176 upwardly as viewed in FIG. 14 until the enlarged portion 175 of the pin moves out of the enlarged portion 185 of the slot 178 and moves a reduced portion 191 of the pin 176 into the slot 178. The operator pushes the button portion 176a upwardly, and the reduced portion travels freely through the slot 178 until reaching the enlarged portion 177 of the slot 178. Then the button portion 176a is released and the spring 183 presses the enlarged portion 175 of the pin into the enlarged portion 177 of the slot 178. During this movement, a release pin 194 on the spring 183 travels along arcuate slot 195.

To insure that the sprocket guides 41, 42 and 43 are in their operative position when the film end is to be automatically threaded, the automatic threading device releases any of the sprocket guides which is in retracted position. This is effected as to the sprocket guide 41 by a releasing cam 196 (FIG. 2) formed on the lever 51, which presses the pin 194 inwardly to move the leaf spring 183 away from the mounting plate 169 and move the enlarged portion 175 out of the enlarged portion 177 of the slot 178. The torsion spring 165 then swings the guide 41 to its operative position where it is latched in. The releasing of the sprocket guides 42 and 43 from retracted positions is effected by releasing cams 198 on a plate 199 which press releasing pins (not shown) similar to the releasing pin 194. The plate 199 as illustrated in FIGS. 7 and 9 is sandwiched between levers 112 and 121 and is keyed to the lever 112 for movement therewith by a pin 201 which projects into hole 202 in the lever 112. Also, the lens mount 74 when swung from its open position to its closed position will press the button 176a to release the sprocket guide 42 when the latter is in its retracted position.

The above described device serves to surely and precisely and automatically lace or thread the film around the sprockets 22 and 24 and the sound drum 25 and through the gate 23 with loops of precise lengths and with a precise length of film between the shuttle 91 and the sound pickup portion of the sound drum. The device also permits manual removal and rethreading of the portion of the film intermediate its ends.

While the invention is thus described, it is not wished to be limited to the precise details described, as changes may be readily made without departing from the spirit of the invention.

What is claimed is:

1. In a projector, a sprocket for advancing a film, film guiding means spaced from the sprocket defining a path resistant to free movement of the film therethrough, a pair of film guides mounted between the sprocket and the film guiding means and on opposite sides of the film as the film leaves the sprocket, and means moving both the film guides toward one another from retracted positions to operative positions in which the film guides form a restricted path to the film guiding means to feed the forward end of the film into the film guiding means and restrict the film as the film is pushed into the film guiding means by the sprocket.

2. The projector defined by claim 1 wherein one of the film guides is positioned outside the path of the film as it travels from the sprocket to the film guiding means to effect a loop-forming operation.

3. The projector of claim 1 wherein the film guiding means includes an aperture plate and a pressure plate urged toward the aperture plate, one of said film guides having an end portion positionable near the end of the aperture plate and overhanging the aperture plate for directing the forward end of the film past the end of the aperture plate, the other of said film guides having an end portion positionable near the end of the pressure plate for guiding the forward end of the film past the end of the pressure plate.

4. In a projector, an upper sprocket, a sprocket guide for holding film in engagement with the sprocket, whereby film is advanced substantially horizontally by the sprocket, a vertically positioned aperture plate, a pressure plate urged toward one face of the aperture plate, a first lever movable manually and having a curved inner guide movable from a retracted position to a position defining an inner side of a path for the film from the sprocket between the aperture plate and the pressure plate, and a second lever interlinked with and movable by the first lever and having a curved outer guide defining the outer side of said path and serving to guide the forward end of the film in a loop past the upper end of the aperture plate.

5. The projector defined by claim 4 wherein the outer guide has a lower end portion which overhangs the upper end of the aperture plate and the lower end of the inner guide overhangs the upper end of the pressure plate.

6. The projector defined by claim 4 wherein the outer guide has an outwardly flared entrance end portion spaced from the sprocket guide to define a spillout gap therebetween and the inner guide has a recessed portion positioned in the path of the film just before the spillout gap to relieve bending of the film as it is started out the spillout gap during a jam.

7. In a projector including a film gate, first sprocket means for feeding film toward the gate, and second sprocket means for feeding film from the gate, the combination therewith of upper loop forming means, lower loop forming means, actuating means for moving the upper and lower loop forming means from retracted to operative positions, means urging the loop forming means toward retracted positions, latching means urged toward a latching position holding the loop forming means in operative positions and including a trigger member in the path of the forward end of the film as the forward end of the film is pushed from the second sprocket means, a guide member positioned to engage the film after it leaves the second sprocket means, the trigger member including a generally longitudinally curved surface which co-acts with said guide member to bend the film around a portion of the periphery of said guide member, said generally longitudinally curved surface being further curved in a transverse direction and cooperating with a complementary surface on the guide member to bend the film about its longitudinal axis to stiffen the forward end portion of the film as it is pushed against the trigger member.

8. In a projector, a film gate, a sprocket for advancing the forward end of a film, a curved outer film guide movable between a retracted position and an operative position for guiding the forward end of the film along a curved path into the film gate, a curved inner film guide positioned on the inside of the curved path of the film and movable from a retracted position spaced from said path and from said outer film guide to an operative position near said path and said outer film guide, and means for moving the guides simultaneously toward one another from their retracted positions to their operative positions.

9. In apparatus of the type including a means for forming a loop in a strip of film and means for moving the loop forming means from an operative position to an inoperative position the improvement comprising; a movable trigger for actuating said means for moving, guide means for engaging a film and cooperating with the trigger to bend the film about an axis transversely of and spaced away from its longitudinal axis, said guide means being mounted in close proximity to said trigger, film feeding means for advancing the forward end of a film between the guide means and the trigger, a curved film engaging surface on said guide means, a curved portion on said trigger of a shape substantially complementary to said curved surface on the guide means and positioned so close to said guide means that a film being bent around the guide means will engage the curved portion of the trigger and be flexed thereby about its longitudinal axis when the loop forming means is in its operative position, said flexing of the bent film about its longitudinal axis causing the film to become rigid to the point where it will force said movable trigger away from said guide means and cause it to actuate the means for moving the loop forming means to its inoperative position.

10. The combination of claim 9 wherein the guide means is a roller varying in diameter between its center and outer ends.

11. In an automatic threading projector including a projection aperture, a sprocket, a sprocket guide urged toward an operative position with respect to the sprocket and movable to a retracted position wherein a film can be placed on or removed from the sprocket, loop forming means movable in a plane transversely of the axis of the sprocket from a retracted position to a threading position for guiding and forming a loop in a film passing between the sprocket and the projection aperture, means for selectively latching the sprocket guide in its retracted position, and actuating linkage means operably engaged with said latching means and responsive to movement of the loop forming means to its threading position for actuating the latching means to release the sprocket guide to permit the sprocket guide to return to its operative position.

12. The projector of claim 11 wherein there is provided a mounting plate, means mounting the sprocket guide pivotally on the mounting plate, said means for selectively latching comprising a latching pin having an enlarged portion carried by the sprocket guide, said plate having a slot provided with an enlarged opening for receiving the enlarged portion of the latching pin, and means urging the latching pin into the opening to latch the sprocket guide to the plate in its retracted position, said actuating linkage means including means for moving the enlarged portion of the pin out of the opening to release the sprocket guide as the loop forming means is moved to its threading position.

References Cited in the file of this patent

UNITED STATES PATENTS

| | | |
|---|---|---|
| 1,997,409 | May | Apr. 9, 1935 |
| 2,023,065 | Conrad et al. | Dec. 3, 1935 |
| 2,024,660 | Riddell | Dec. 17, 1935 |
| 2,114,608 | Ross | Apr. 19, 1938 |
| 2,266,362 | Forster | Dec. 16, 1941 |
| 2,327,776 | Fairbanks et al. | Aug. 24, 1943 |
| 2,420,587 | Dietrich | May 13, 1947 |
| 2,427,773 | Fort | Sept. 23, 1947 |
| 2,488,142 | Pratt et al. | Nov. 15, 1949 |
| 2,538,520 | Holt et al. | Jan. 16, 1951 |